CIRCUIT USING VARIABLE TIME DELAY AND RELAXATION OSCILLATOR TO TRIGGER A CONTROLLED RECTIFIER

Filed Jan. 27, 1965

INVENTOR
JAMES C. NEISCH

BY Strauch, Nolan & Neale
ATTORNEYS

3,292,015
CIRCUIT USING VARIABLE TIME DELAY AND RELAXATION OSCILLATOR TO TRIGGER A CONTROLLED RECTIFIER

James C. Neisch, Warren, Mich., assignor to Rockwell-Standard Corporation, Pittsburgh, Pa., a corporation of Delaware Filed Jan. 27, 1965, Ser. No. 428,422
8 Claims. (Cl. 307—88.5)

This invention relates to improvements in electrical control circuits and more specifically to improvements in rectifier control circuits.

The control circuit of this invention utilizes a phase shift network and inductor transients. It produces a constant amplitude output control voltage synchronized with and having a duration extending for the full 180° of the half-cycle of a standard A.C. sine wave which is to be rectified. This constant amplitude voltage is utilized in conjunction with a selectively variable time delay circuit and a relaxation oscillator to provide one micro second trigger impulses which may be utilized to synchronously control the firing phase angle and thereby control the power output of a silicon controlled rectifier (SCR) delivering power to the resistive load of an electric oven or heater from the same power source.

It has been common practice to control the delivery of electrical power to a load by means of a Variac, particularly where it is necessary to vary the power delivered to various loads at various times. Though performing satisfactorily for many purposes, Variacs have inherent disadvantages if utilized to control large currents (in excess of 20 amperes). These disadvantages are excess size and cost and insensitivity of control. As a result of these disadvantages, Variacs are generally considered unsuitable for use in circuits controlling large load currents which require finely adjustable control over a wide range of the power delivered to the load.

High-wattage silicon controlled rectifiers (SCR's), a recent development in electronics, have shown much promise in application to circuits as just described above as a substitute for the Variac. The operation of an SCR is analogous to that of an ordinary diode, once it starts conducting. It differs from the ordinary diode, however, in that it, like a thyratron tube, requires a gate-triggering voltage pulse to initiate conduction. By controlling the timing of the gate-triggering pulse with reference to the phase of the cycle of the applied alternating current, it is possible to control the average rectified power output of the SCR.

The circuits heretofore proposed for generating the control impulse to the SCR have been of two types: those utilizing at their inputs a D.C. source and those utilizing at their inputs the same A.C. source as the load. Neither has been satisfactory. With the former it is impossible to synchronize the control impulse with the cycle of the power source. With the latter the impulse can be generated only during a very limited range of the cycle, generally from 210° to 330°. Since the required magnitude of input supply voltage to the impulse generator is available for control purposes during only about 120° of the full 180° of the positive cycle, the range of control of the average power output of the SCR is approximately one-third less than the maximum of 180°.

To permit wider application and more versatile control of the SCR, it is therefore desirable to have a synchronized constant amplitude control voltage available for the full 180° of the half-cycle of the line voltage to be rectified. Such an extended range of availability of the control voltage has immediate application in the control of the speed of series-wound D.C. motors, in the control of the intensity of a bank of infra-red lamps, and in the control of the temperature of electric ovens, for example.

The primary object of the present invention is to provide a circuit responsive to an alternating current sine wave input to produce a control voltage of constant amplitude and which is fully synchronized with and having a duration at least equal to the duration of the one-half-cycle of said sine wave input which is to be rectified whereby, through use of a selectively variable time delay circuit, it is possible to selectively rectify any desired proportion of such half-cycle.

More specifically, it is a principal object of this invention to provide a half wave rectifier which utilizes a phase shift network and inductive transients in its input to obtain a constant amplitude synchronized output voltage for at least the full 180° of the positive half-cycle of a standard A.C. sine wave input voltage.

Another object resides in the utilization of this circuit in conjunction with a standard SCR unijunction trigger oscillator to provide for an extended range of control over the firing angle of the SCR and of its average power output.

It is still the further object of this invention to provide an electric oven utilizing this extended range of control over the average power output of the SCR to provide a more sensitive and broader range of temperature control.

These and other objects of the present invention will become more fully apparent by reference to the appended claims and as the following detailed description proceeds in reference to the accompanying drawings wherein:

Figure 1:
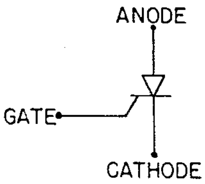
FIGURE 1 is a schematic illustration of a silicon controlled rectifier.

Referring now in detail to the drawings, FIGURE 1 illustrates a conventional arrangement of a silicon controlled rectifier, having an anode, a cathode and a gate.

Figure 2:
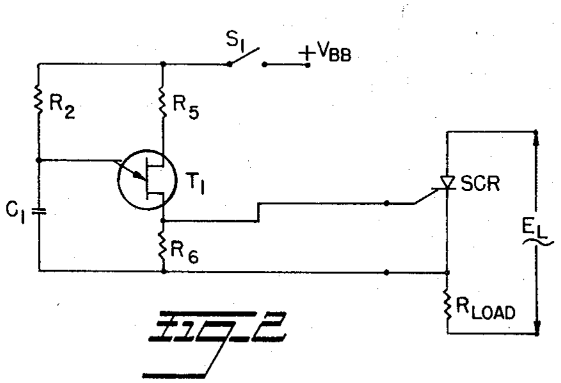
FIGURE 2 is a schematic diagram illustrating the use of battery powered relaxation oscillator for asynchronously controlling the operation of a silicon controlled rectifier.

In FIGURE 2 such a silicon controlled rectifier (SCR) is connected in series with a resistive load R (LOAD) across a conventional alternating current power source $E_L$. The firing signal for the silicon controlled rectifier SCR is developed across a resistor $R_6$ by the relaxation oscillator formed by the transistor $T_1$, the resistors $R_2$, $R_5$ and $R_6$ and the capacitor $C_1$, the time of firing of the transistor $T_1$ with respect to the closing of the switch $S_1$ to the source of direct current or battery $V_{BB}$ being determined by the relative magnitudes of the capacitor $C_1$ and the resistance $R_2$. As is apparent, it is impossible practically to synchronize the application of the voltage from battery $V_{BB}$ by the closing of the switch $S_1$ with the cycle of the power source $E_L$.

Figures 3, 4, 5:
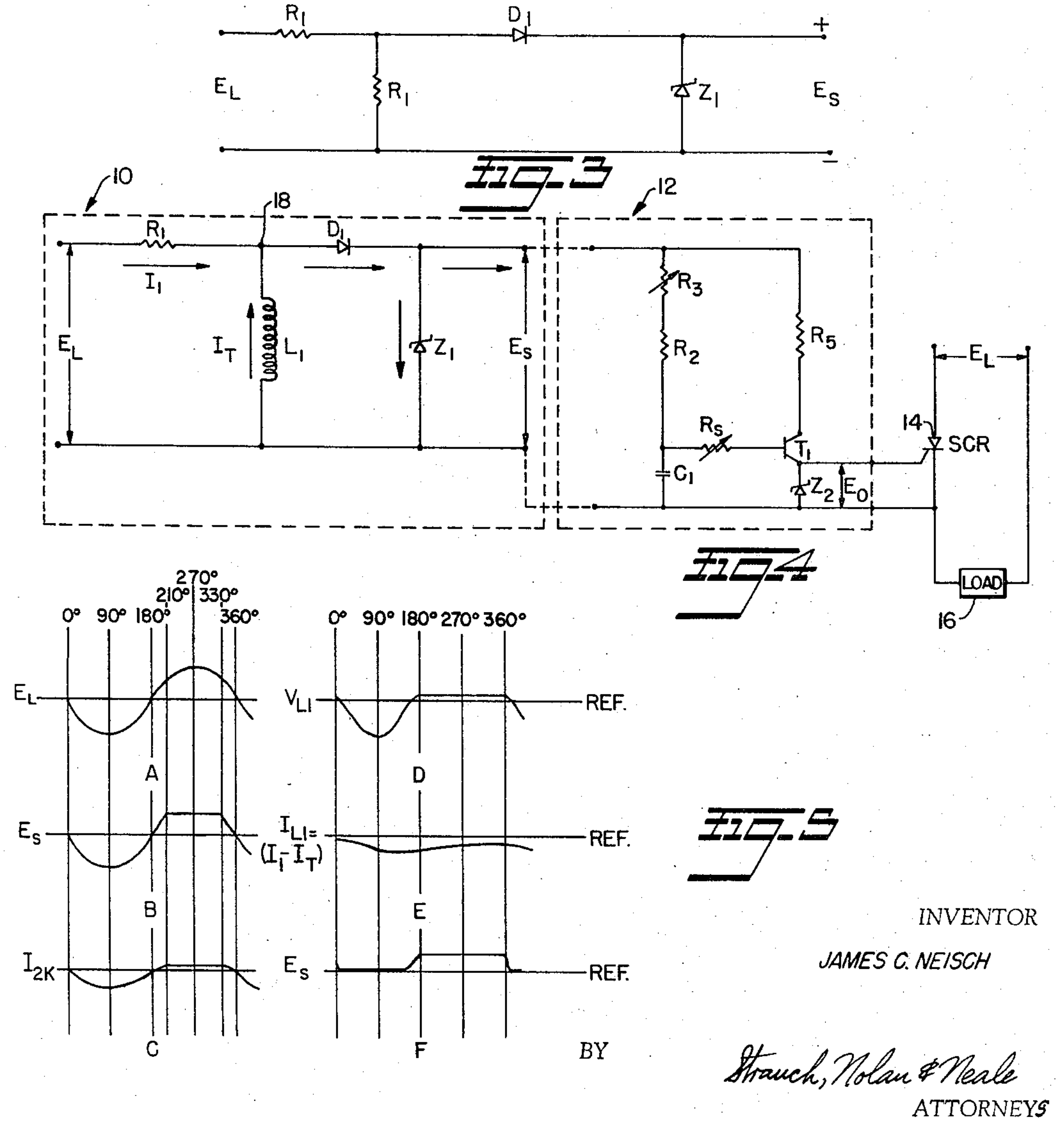
FIGURE 3 is a schematic diagram illustrating a typical prior circuit utilized for generating a synchronized control voltage for application to the input of the relaxation oscillator for controlling the firing of the silicon controlled rectifier as illustrated in FIGURE 2.
FIGURE 4 is a schematic diagram illustrating the circuit of the present invention.
FIGURE 5 is a diagram illustrating voltages and currents as they appear in the circuits of FIGURES 3 and 4.

FIGURE 3 illustrates a circuit suitable for generating a positive control potential or square wave in synchronism with the cycle of the power source $E_L$. This circuit consists of a pair of resistors $R_1$ and $R_1'$ connected in series across the power source $E_L$ and a diode $D_1$ and Zener or avalanche diode $Z_1$ connected in parallel with the resistor $R_1'$. The relation between the cycle of the power source $E_L$ and the output voltage $E_S$ of the circuit of FIGURE 3 is illustrated at A and B in FIGURE 5. The positive voltage appearing between 210° and 330° in the second half of the cycle in FIGURE 5B is the voltage required, when applied to the input of a circuit, such as illustrated in FIGURE 2, to initiate conduction of the transistor $T_1$ following lapse of the time constant as determined by the magnitudes of capacitor $C_1$ and resistor $R_2$. From this it is apparent that such a circuit permits development of a synchronized pulse across $R_6$ for transmission to the gate of the silicon controlled rectifier but only within the 120° interval between 210° and 330°, that is during only approximately two-thirds of the half-cycle during which the silicon controlled rectifier could conduct.

Examples of typical prior art control circuit for firing controlled rectifiers are illustrated in U.S. Patent No. 3,146,392, issued August 25, 1946, to T. P. Sylvan for "Control Circuits Employing Unijunction Transistors for Firing Controlled Rectifiers and in Electronic Engineering Principles," Third Edition, John D. Ryder, Prentice-Hall, Inc. at p. 380 et seq.

The present invention as illustrated in FIGURE 4 provides a circuit which, in response to sine wave input signal $E_L$ (FIGURE 5A) will produce an output square wave or constant amplitude positive control potential having its leading edge synchronized with the input sine wave $E_L$ and having a duration at its constant amplitude positive rated output spanning in duration the entire positive half-cycle of the input sine wave as is illustrated at 5F. This permits generation of an impulse to initiate conduction of a silicon controlled rectifier at any desired point within the entire 180° of the positive half-cycle from the power source, thus extending the range of control by an additional 60° as compared with the circuit of FIGURE 2.

With particular reference to FIGURE 4, the 180° constant amplitude voltage control and synchronizing circuit 10 has its input connected to the source of incoming A.C. line voltage $E_L$ to be rectified. Normally this will be 110–120 v., 60 c.p.s. Circuit 10 comprises a simple RL phase shifting network consisting of resistor $R_1$ and inductor $L_1$ connected in series across the input; a diode $D_1$ (to provide for half wave rectification of $E_L$) and an avalanche or Zener diode $Z_1$ (to provide a rated constant amplitude output supply voltage $E_S$) connected in series and in parallel with the inductance $L_1$.

FIGURE 4 illustrates the preferred embodiment of control circuit 10 utilized in conjunction wtih a relaxation oscillator (similar to that of FIGURE 2) and designated as circuit 12 in FIGURE 4, to control the turn-on time of SCR 14 which regulates electrical power to resistive load 16 such as one finds in an electrical heating device or oven.

With reference now to the circuit of FIGURE 3, the circuit 10 of FIGURE 4 and the waveforms of FIGURE 5, the operation of the phase shift network of FIGURE 4 and its effect upon the supply voltage $E_S$ will be explained. FIGURE 5A is a graphical illustration of the incoming A.C. line voltage $E_L$ as applied to the circuits of either FIGURE 3 or 4 and is a standard sine waveform. Figure 5B illustrates the normal output supply voltage $E_S$ from the circuit of FIGURE 3, that is inductor $L_1$ as in FIGURE 4 has been replaced by a resistor $R_1'$ as in FIGURE 3. FIGURE 5C shows the waveform of current through this resistor $R_1'$. When inductor $L_1$ is in the circuit, as in FIGURE 4, FIGURE 5D depicts the voltage drop across $L_1$; and FIGURE 5E illustrates the waveform of the algebraic difference of currents or the net resultant current flowing through or from $L_1$; FIGURE 5F depicts the output supply voltage $E_S$ when $L_1$ is part of circuit 10 as in FIGURE 4.

A comparison of FIGURES 5B and 5F readily indicates that the presence of $L_1$ in the circuit has extended the *rated* output range of the circuit from approximately 205° to 335° to a range of 180° to 360°, where rated output is the rated potential across $Z_1$, and in effect has fully synchronized $E_S$ with the positive half-cycle of $E_L$. Briefly this is accomplished by twice phase shifting the output supply voltage $E_S$ with respect to $E_L$ by an angle $\phi$. This angle $\phi$ at any given time is a function of the total resistance of $R_1$ and $L_1$; the inductance of $L_1$; and the magnitude of the transient current from $L_1$. The following is a detailed description of the operation of the circuit 10.

Assuming $E_L$ (FIGURE 5A) is well into the negative half of its cycle (45° for example), the potential at junction 18 (FIGURE 5D) is also negative maintaining the diode $D_1$ turned off (see FIGURE 5F) and transient current $I_T$ which flows from $L_1$ and exists at all times when the circuit is energized is now presently in opposition to $I_1$ (see FIGURE 5E). However $I_T$, which has been decaying since the prior positive half-cycle, tends to have a minimal effect upon the circuit at this time. Thus the circuit at this time may be considered as reduced to a simple series circuit where $I_1$ approximates the algebraic difference of current flow through $L_1$ as shown in FIGURE 5E, the direction of current flow being from the source through $R_1$ to and through $L_1$ back into the source, this current lagging line voltage $E_L$ by the angle $\phi$.

This condition of series current flow through the RL network with $D_1$ turned off continues until $E_L$ (FIGURE 5A) starts at 90° to swing toward the positive half of its cycle. At this time, the polarity at junction 18 (FIGURE 5D) also swings toward positive, reversing the direction of change of the potential drop across $L_1$ causing transient current $I_T$ to flow at its maximum magnitude from $L_1$ into junction 18, thereby effectively short-circuiting the phase shifting characteristics of the RL network out of the circuit. $I_T$ reaches its maximum slightly before 120° as indicated in FIGURE 5E.

With the phase shifting network effectively out of the circuit and inductor $L_1$ acting as a current generator producing current flow into junction 18, the following occurs:

(1) Line voltage $E_L$, which had been leading $I_1$ by the phase angle $\phi$, steps back into phase with $I_1$, becoming negative again;

(2) The potential at junction 18, which had been swinging positive with $E_L$, is maintained positive by the transient voltage and current of $L_1$;

(3) Diode $D_1$ is biased on as junction 18 remains positive;

(4) With the magnitude of $I_T$ much greater than the opposing $I_1$, current flows from $L_1$ to junction 18 where it branches to the source and to $D_1$;

(5) With junction 18 positive and $D_1$ conducting, the avalanche or Zener diode $Z_1$ fires producing *rated* $E_S$ across the terminals indicated in FIGURE 4.

Note that the leading edge of the square wave $E_S$ (FIGURE 5) is made to appear positive as a result of this transient condition before the now-in-phase $E_L$ has again swung positive, i.e., before 180°. Thus, in effect, rated $E_S$ has been phase shifted so that the leading edge of this square wave (the required positive constant amplitude control voltage $E_S$) appears before $E_L$ passes through 180°, thereby applying the rated $E_S$ to the input of the pulse generator circuit in synchronism with $E_L$ before $E_L$ swings positive.

As previously noted, $I_1$ and $I_T$ are in opposition when $E_L$ steps back into phase with $I_1$, their respective magnitudes at this time being such that their algebraic difference produces a current flow from $L_1$ into junction 18 which is more than ample to maintain junction 18 positive and avalanche diode $Z_1$ conducting hard enough to produce rated $E_S$ until such time as $E_L$ and $I_1$ swing positive at 180° and are of sufficient magnitude to sustain $E_S$ at approximately 210°. This latter condition occurs when the magnitude of line voltage $E_L$ exceeds the avalanche diode potential. During this time period when $E_L$ is positive, $I_1$ and $I_T$ aid each other in maintaining $E_S$.

Assuming $L_1$ could at this instance be replaced by a resistor as in FIGURE 3, $I_T$ would disappear. However $I_1$ would maintain the rated constant output supply voltage until the magnitude of $E_L$ fell below the avalanche diode potential at approximately 335°. FIGURES 5B and 5C indicate that at that time current through the resistor substituted for $L_1$ as in FIGURE 3 and $E_S$ start to swing in a negative direction. Thus, with $L_1$ removed from the circuit, rated $E_S$ is available for less than the full positive half-cycle of $E_L$.

Now considering the same time period with $L_1$ in the circuit as in FIGURE 4, paying particular attention to the waveforms of FIGURES 5D, 5E, and 5F: as $E_L$ passes through 335° falling below the avalanche diode potential, the transient positive voltage at junction 18 is maintained positive by the still positive-going transient current $I_T$, which though still decaying is of sufficient magnitude to keep $Z_1$ conducting until $E_L$ swings negative again causing the flow of $I_1$ to oppose $I_T$. When $I_1$ is of such magnitude as to algebraically reverse the flow of current in $L_1$ (at 360° approximately), diodes $D_1$ and $Z_1$ will be turned off. This latter condition does not occur until $E_L$ and its lagging current $I_1$ have both passed through 360° thereby allowing the circuit to maintain a constant rated supply voltage $E_S$ for more than the full 180° of the positive half-cycle of the incoming line voltage $E_L$.

The relaxation oscillator shown in circuit 12, FIGURE 4, utilizes a unijunction transistor $T_1$ to perform the SCR switching function. This standard circuit is compact in size and requires only a minimum number of passive components to form the basic oscillator circuit with the unijunction transistor 20 being the sole active component required. When circuit 10 first provides its positive rated output voltage $E_S$ to the oscillator circuit (the leading edge of the positive square wave of FIGURE 5F), capacitor $C_1$ begins to charge through $R_2$ and $R_3$. When it reaches a predetermined potential, it discharges, forward biasing the emitter diode of the unijunction transistor $T_1$, causing current flow through the transistor $T_1$ to turn on Zener diode $Z_2$. With $Z_2$ turned on a positive-going voltage impulse with a very sharp peak is developed across its terminals. This is the gate-triggering pulse to the SCR. Current flow through transistor $T_1$ ceases when the discharge voltage no longer forward biases the emitter.

The frequency of this cycle is a function of the magnitude of the resistances $(R_2+R_3)$ and capacitance $C_1$; and, by controlling $E_S$ or the time constant $(R_2+R_3)\ C_1$, it is possible to control the timing of the impulse to and the firing phase angle of the SCR and hence to control its average power output. As a constant $E_S$ is made available by the circuit 10 for the full 180° of the positive cycle of the power source voltage $E_L$, full control over the firing phase angle of the SCR between 180° and 360° is attainable by merely varifying $R_3$, whereas a half wave rectifier without the phase shift network as in FIGURE 3 would normally present control over only the middle 120° to 140° of the positive half-cycle of $E_L$.

FIGURE 4, as previously mentioned, is the basic circuit of an electric heater or oven controlled in accord with the present invention. Where electricity is utilized as the power source for a heating device, the temperature within the oven is a function of the ohmic size of the resistive element (which is generally a fixed constant) and the load current magnitude or the conducting time of the load current. The circuit of FIGURE 4 controls the temperature within the oven by controlling the conducting time of the load current, and provides for very sensitive control of the temperature as a multi-turn potentiometer may be used at $R_3$ to control the firing phase angle of the SCR, this fine degree control being extended over the full 180° of the positive half-cycle of $E_L$. A bank of infra-red lamps as the load may be similarly controlled.

It should be noted that the half wave rectifier and phase shift network of circuit 10, FIGURE 4, (without the relaxation oscillator of circuit 12) can be utilized to control the speed of series wound D.C. motors allowing for particularly fine control ordinarily not available over the low speed region except through the use of more elaborate and expensive circuits.

The invention may be embodied in other specific forms without departing from the spirit or essential characteristics thereof. The present embodiment is therefore to be considered in all respects as illustrative and not restricted, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination, a diode rectifier; impulse responsive means for controlling, within a predetermined half-cycle of an applied A.C. input voltage, the phase angle at which said diode rectifier will initiate conduction; and means selectively operative to produce and apply to said impulse responsive means an impulse synchronized with said applied input voltage at any selected phase angle within the entire duration of said predetermined half-cycle.

2. A device for controlling the firing of a silicon controlled rectifier connected between an alternating current power source and a load having various power requirements, said device comprising:

(a) means responsive to the voltage from said source for producing an asymmetrical square wave providing during its longer half-cycle a constant amplitude control voltage spanning in duration a given one of the opposite half-cycles of the output of said source and having its leading edge synchronized with the cyclic output of said source, (b) selectively variable means for generating from the longer duration half-cycle of said square wave an impulse at any selected time during the entire duration of said given half-cycle of said source after the initiation of such given half-cycle of said source, and (c) means connecting the output of said impulse generating means to the input of said silicon controlled rectifier to initiate conduction of said silicon controlled rectifier whereby, by selective adjustment of said selectively variable impulse generating means, the portion of said given half-cycle of said power source during which said silicon controlled rectifier is conductive can be varied throughout the entire range of said given half-cycle of said power source.

3. A circuit comprising means providing a sine wave input, means for generating from said sine wave input an asymmetrical square synchronized therewith and providing during its longer duration half-cycle a constant amplitude output voltage of a duration greater than and spanning in duration the longer duration one-half-cycle of the sine wave input, said last named means comprising: a pair of input connections, a resistance and an inductance connected in series between said input terminals, a diode rectifier and a Zener diode connected in parallel with said inductance, and a pair of output connections from the opposite sides of said Zener diode.

4. A circuit for generating an impulse at any selected time during the entire duration of one-half cycle of a sine wave input comprising: a pair of input connections, a resistance and an inductance connected in series between said input connections, a diode and Zener diode connected in parallel with said inductance, a relaxation oscillator including a series connected capacitor and variable resistance connected in parallel with said Zener diode and having a second Zener diode at the output thereof.

5. In combination with an alternating current power source, a load having variable power requirements, and a silicon controlled rectifier interposed therebetween for controlling the transmission of power from the power source to the load, means for controlling the operation of said silicon controlled rectifier comprising: a resistor and an inductance in series across said alternating current power source, a diode and Zener diode connected in series across said inductance, and a relaxation oscillator having its output terminals connected to the control element of said silicon controlled rectifier and its input terminals connected across said Zener diode.

6. The combination defined in claim 6 wherein said relaxation oscillator comprises a unijunction transistor, a variable resistance and a resistance capacitor time delay circuit connected between said Zener diode and the control element of said unijunction transistor to provide a variable time delay between the conduction of said Zener diode and the activation of said oscillator, a second Zener diode connected to said transistor and across the output of said relaxation oscillator to the control element of said silicon controlled rectifier whereby said second Zener diode is operative to impart an impulse to said silicon controlled rectifier at any selected time during the half-cycle of the output of said power source during which said silicon controlled rectifier may conduct which time is determined by selective variation of the resistance in the resistance capacitor input circuit to said transistor of the relaxation oscillator.

7. For use in combination with an alternating current power source and a load having variable power requirements, a silicon controlled rectifier adapted to be interposed between said power source and said load, and means connected to and synchronized by and the output of said power source, said means including means for generating and imparting to the control element of said silicon controlled rectifier a conduction initiating impulse at any selected time during the entire half-cycle of the output of said power source during which said silicon controlled rectifier may conduct.

8. In combination, an electrical energy source having a sine wave output, means adapted to be connected to said source for producing from the sine wave output of said energy source a constant amplitude asymmetrical square wave output synchronized with said sine wave output, and means for timing the phase and duration of such constant amplitude asymmetrical square wave so that its longer duration half-cycles spans the duration of a predetermined one of the half-cycles of the sine wave output of said electrical energy source.

References Cited by the Examiner

UNITED STATES PATENTS 3,056,046 9/1962 Morgan ----------- 307—88.5

OTHER REFERENCES

F. W. Gutzwiller: G.E. Application Note 200, 27 Oct. 1962, pp. 10–12.

ARTHUR GAUSS, *Primary Examiner.*

J. BUSCH, *Assistant Examiner.*